March 11, 1969   J. D. KINGSLEY ET AL   3,432,769
COHERENT LIGHT SOURCE UTILIZING PENTAVALENT MANGANESE
ACTIVATED CALCIUM CHLOROPHOSPHATE CRYSTAL
Filed Aug. 24, 1964

Inventors:
Jack D. Kingsley;
Jerome S. Prener,
by
Their Attorney.

United States Patent Office 3,432,769
Patented Mar. 11, 1969

3,432,769
**COHERENT LIGHT SOURCE UTILIZING PENTA-
VALENT MANGANESE ACTIVATED CALCIUM
CHLOROPHOSPHATE CRYSTAL**
Jack D. Kingsley and Jerome S. Prener, Schenectady,
N.Y., assignors to General Electric Company, a corporation of New York
Filed Aug. 24, 1964, Ser. No. 391,409
U.S. Cl. 331—94.5
Int. Cl. H01s 3/00; C09k 1/04
6 Claims

ABSTRACT OF THE DISCLOSURE

A four-level optical maser adapted to emit coherent infrared radiation when stimulated to a population inversion utilizes, as the active medium thereof, a crystal of a calcium chlorophosphate activated with pentavalent manganese.

---

The present invention relates to optical masers or lasers and more particularly relates to the provision of a novel four-level optical maser.

The current wide interest in optical masers has developed numerous applications and corresponding demands for such devices. Further, in the selection of an optical maser for a particular application, it is desirable that a wide range of alternatives be available, so that a maser having properties as close as possible to those required in a particular situation may be made. For example, in many situations, a particular wavelength output is required while in others, equipment conveniently at hand may dictate the maximum pumping energy or its wavelength.

It has also been found that, while masers operating on the basis of transitions between three energy levels are suitable, masers having four levels are preferred because the threshold pumping power required to initiate laser action is lower and the efficiency is higher.

Accordingly, it is an object of the present invention to provide a novel optical maser device.

It is a further object of the present invention to provide a novel four-level optical maser.

Figure 1:
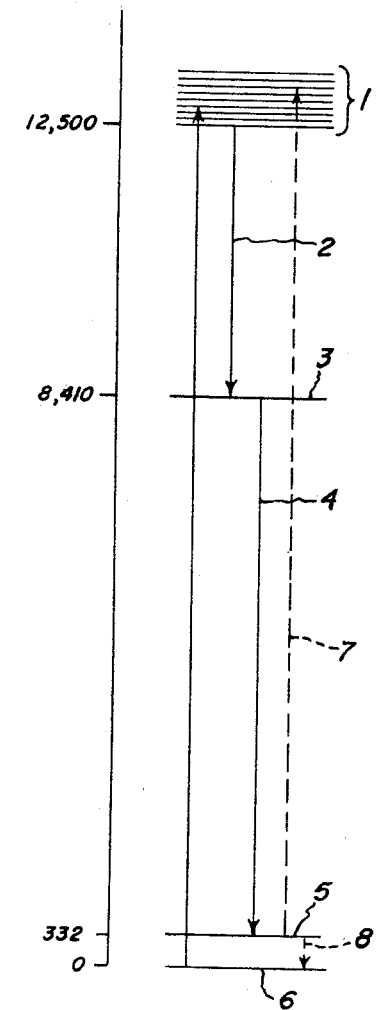
Figure 2:
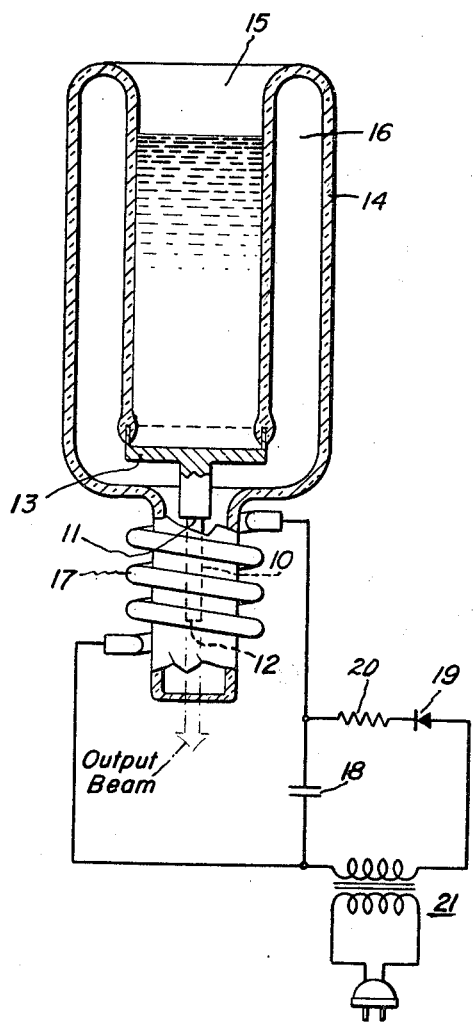

The novel features believed characteristic of this invention are set forth in the appended claims. The invention itself, together with further objects and advantages may best be understood by reference to the following description taken in connection with the appended drawing in which:

FIG. 1 is a schematic representation of the energy levels of the device of the present invention, and FIG. 2 illustrates apparatus for utilizing a device constructed in accord with the present invention.

Briefly, in accord with one embodiment of the present invention, an optical maser device is provided which comprises a single crystal of calcium chlorophosphate, that is, either calcium chloroapatite, or spodiosite doped with pentavalent manganese. The respective chemical formulas are $Ca_5(PO_4)_3Cl:MnO_4^{-3}$ and $Ca_2PO_4Cl:MnO_4^{-3}$. Pentavalent manganese possesses energy levels which enable its operation as an optical maser, in particular as a four-level optical maser, due to transitions among various energy levels of the crystal. Suitable crystals of either of the chlorophosphates doped with pentavalent manganese may be grown by preparing a solution of $Ca_3(PO_4)_2$ in fused $CaCl_2$ and containing a predetermined amount of $MnCl_2$ and precipitating the desired crystals by cooling. This is performed in an oxygen-containing atmosphere so that the manganese in the crystal is in the pentavalent state.

Specifically to produce crystals of calcium chlorophosphate doped with pentavalent manganese in accord with the present invention, a solution of calcium phosphate, $Ca_3(PO_4)_2$, in fused anhydrous calcium chloride, $CaCl_2$, is provided, the amounts being appropriate to grow the desired chlorophosphate, and including a predetermined amount, for example, in the range of .03 to .05 percent by weight, of anhydrous manganese chloride, $MnCl_2$. For calcium chloroapatite production, the percent by weight of calcium phosphate is in the range of 15% to 35% and is preferably approximately 30% while for spodiosite production it is in the range of 5% to 11% and is preferably approximately 10%. The solution is fused at a temperature which depends on the composition. For calcium chloroapatite mixture this lies above 1020° C. and for the spodiosite mixture this lies below 1020° C.

A first method of growing crystals from such a solution, which may be used to produce either the calcium chloroapatite or the spodiosite, depending on the percentages used, comprises cooling the solution very slowly down to the temperature at which small crystals of the equilibrium solid phase of the desired chlorophosphate are formed. With further slow cooling, the selected solid material crystallizes and the liquid composition varies along the liquidus curve. The calcium chloroapatite crystals are hexagonal columns while the spodiosite crystals grow as orthorhombic tablets.

According to another method, a thermal gradient is set up in the liquid solution, the top being colder than the bottom. Excess solid on the bottom of the container dissolves at the higher temperature and is transported to the cooler top by convection currents where it precipitates out on a seed immersed in the liquid. The second method has been successful in growing spodiosite crystals. In either case, the growth is done in an oxygen-containing atmosphere so as to produce pentavalent manganese in the crystal.

Laser operation arises from the transition of ions among various energy states. Without excitation, the ions in question exist in a condition of lowest energy and greatest stability known as the ground state. This corresponds to a particular state of motion of electrons around the nucleii. When pumping energy of the proper form, for example light of the proper wavelength, is supplied, the ions are raised to a state of greater energy corresponding to a different state of motion of the electrons. Ions in the excited states spontaneously lose the added energy by one or more transitions until they return to the ground state. The energy lost in the transitions may be dissipated as heat in a radiationless transition or may be radiated as a quantum of electromagnetic radiation.

In three-level laser operation, most of the ions drop first to an intermediate state of lower energy and then to the ground state. The first of these transitions is radiationless, the energy being lost in the form of heat. The second transition results in the radiation of energy as an electromagnetic wave. To achieve laser operation, a certain minimum population inversion between the ground state and the intermediate state must be accomplished; that is, the number of ions in the crystal at the intermediate level must be increased until it is sufficiently greater than the number of ions in the ground state to compensate for losses within the laser. When this condition is reached, the electromagnetic radiation emitted by the ions dropping from the intermediate level to the ground level, in its passage through the material, tends to induce other ions to emit in-phase electromagnetic radiation. By polishing two parallel ends of the crystal so as to reflect parallel waves through the crystal many times and by supplying enough energy to cause population inversion, a rapid buildup is achieved of coherent, parallel electromagnetic waves. If one of the parallel ends is made slightly transmissive, rather than completely reflective, part of the coherent parallel radiation is transmitted therethrough. This is the laser beam.

In a four-level laser, the operation is similar except that the radiation-producing transition is between a first intermediate energy level and a second intermediate energy level. The ion may then return to the ground state by a radiationless transition or may be pumped to a higher level. Since the determining factor for the threshold of laser action is a population inversion between initial and terminal states of the radiation-producing transition, the required excess of the initial over the terminal need not be an excess of excited ions over the highly populated ground state, but only over the initially-unpopulated, lower intermediate excited state. That is, in a three-level maser, population inversion is achieved only when more ions are in the intermediate level than are in the normally heavily populated ground state. In a four-level maser, the lower intermediate level is essentially unpopulated initially and therefore fewer ions must be pumped to the higher intermediate energy level to achieve population inversion with respect to the lower intermediate energy level. Further, due to the lower threshold required in a four-level maser, a given power input, even though it produces an absolute number of ions in the higher intermediate energy state relatively no greater than the number in the three-level case, creates a relatively greater population inversion, thereby increasing the power output and providing a more efficient device.

In both of the chlorophosphate crystals as described in the present invention, the $MnO_4^{-3}$ ion is the species which undergoes the transitions of interest. This ion, containing pentavalent manganese, has been found to have a number of excited energy levels corresponding to excited electronic configurations and in addition, a state slightly above the ground level in which there is no electronic excitation but in which the ion is in an excited vibrational state. The radiation-producing transition occurs between the lowest excited electronic state and this ionic vibrational state. This differs from the calcium chlorophosphate doped with manganese customarily used in fluorescent lamps wherein the manganese is bivalent and does not have a suitable energy level structure and therefore cannot exhibit laser action.

In terms of the energy level notation commonly employed, for example, as set forth in "Introduction to Ligand Field Theory" by Carl J. Ballhausen, published by McGraw-Hill Book Co., Inc., 1962, the ground state of the $MnO_4^{-3}$ ion is a $^3A_2$. As shown in FIG. 1, under pumping radiation, the ion is raised, by radiation having a wavelength of approximately 8500 A. or less into one of the plurality of excited energy levels 1 corresponding to various excited electronic states. These energy levels are usually designated in terms of the wave number of reciprocal wavelength which is the number of wavelengths in a centimeter and has a dimension of cm.$^{-1}$. Accordingly, in terms of wave number rather than wavelength, these excited energy level lie above 12,500 cm.$^{-1}$.

After being pumped into one of the excited energy levels, the ion undergoes one or more radiationless, heat-producing transitions 2 to the lowest excited electronic state 3 which, in terms of the previously mentioned notation, is a $^1E$ level. This level lies at a wave number above the ground state of 8410 cm.$^{-1}$. The radiation-producing transition 4, upon which laser action is based, occurs between this level, the lowest of the excited electronic states, and the state 5 in which there is no electronic excitation but in which the ion is in an excited vibrational state. The wave number of this state is 322 cm.$^{-1}$. Accordingly, the wave number of the output radiation is 8410 cm.$^{-1}$—332 cm.$^{-1}$, or 8078 cm.$^{-1}$. The ion may then return to the ground state 6 or may be pumped into the higher levels 1 as illustrated by the dotted transitions 7, 8.

It is noted that to achieve the above described transitions, the crystal is preferably maintained at or below 20° K. since it has been found that above this temperature, the sharp resolution of the energy level 5 begins to decrease and the transitions between the intermediate energy levels decrease in definition.

To facilitate the practice of this invention, the alternate methods of preparing suitable crystals are now set forth in greater detail. A crystal of spodiosite doped with manganese was prepared by placing 40.0 grams of anhydrous $CaCl_2$, 5.1 grams of $Ca_5(PO_4)_3Cl$ and 2.2 grams of anhydrous $MnCl_2$ in a platinum crucible. The melt was kept in air at a temperature of 1040° C. (50° C. above the liquidus temperature) for 24 hours and, in accord with the first method mentioned, was cooled at a linear rate of approximately 3° C. per hour until a temperature of about 800° C. was reached. After 800° C. was reached, the furnace power was shut off and the crucible was cooled to room temperature. Suitable crystals of spodiosite were separated from the solidified mix by leaching with water.

Similar procedures have produced suitable crystals of calcium chloroapatite. In a particular case, the respective amounts of calcium chloride and calcium phosphate were 30.0 grams and 11.7 grams. The solution was fused at a temperature of 1280° C. and cooled at a linear rate of approximately 3° C. per hour to a temperature of 1050° C. The furnace was then shut off, the crucible was cooled to room temperature and crystals of calcium chloroapatite were separated by leaching with water.

In another case, a large crystal of spodiosite doped with manganese was prepared by placing 150 grams of anhydrous $CaCl_2$, 18 grams of $Ca_5(PO_4)_3Cl$ and 8.4 grams of anhydrous $MnCl_2$ in a platinum crucible. In accord with the second method, a temperature of 834° C. was established at the top of the liquid phase and 849° C. at the bottom of the charge. A seed crystal of $Ca_2PO_4Cl$ was immersed in the liquid at the top to a depth of about 0.5 mm., rotated, and withdrawn at a rate of about 1 to 2 mm. per day. A large crystal grew on the seed in three days.

As previously stated, the percent by weight of calcium phosphate and calcium chloride in the fused solution determine the composition of the resultant solid. When a solution containing approximately 10% calcium phosphate and 90% calcium chloride is used, spodiosite can be produced by setting the temperatures as previously indicated. If the amount of calcium phosphate is increased, the solution becomes suitable for the production of calcium chloroapatite. If the amount of calcium phosphate is increased beyond the previously stated limit of 35%, the temperature required becomes impractically high and the calcium chloride may be lost by vaporization.

The crystals grown in accord with these methods are found to contain approximately 0.01 to 10.0 percent by weight of manganese. The amount of manganese present must be more than a trace amount and is preferably less than 10.0 percent by weight. Compounds containing more than this maximum are no longer efficiently luminescent due to quenching by the large concentration of manganese.

The crystals of this invention are used in conventional manner to produce laser light. That is, two opposing surfaces are polished flat and parallel and are silvered so as to reflect internal light. One of these surfaces is made totally reflecting and the other is made a few percent transmissive. The crystal is then placed in conventional apparatus for laser operation.

For example, for low temperature operation, the apparatus shown in FIG. 2 may be utilized. The crystal 10 having a reflective end 11 parallel to partially transmissive end 12 is attached to a copper support member 13 and placed in a cryostat which comprises a glass Dewar vessel 14. A suitable coolant is placed in chamber 15 and the chamber 16 is evacuated.

The crystal 10 is surrounded by a pumping light source such as a helical flash lamp 17 which emits radiation of the required pumping wavelength, specifically 7000 A. to 8500 A. The power circuit for the lamp may comprise a capacitor 18 which charges through diode 19 and resistor 20 from a power souce 21.

In the embodiment shown, the capacitor charges and supplies a suitable operating voltage to the flash lamp 17. The crystal 10 receives the pumping radiation therefrom and laser action ensues as previously described.

While the present invention has been described and exemplified in terms of particular embodiments, both as to the device and as to the method of making the same, many modifications and changes therein will readily occur to those skilled in the art. Accordingly, in the appended claims it is intended to include all such modifications and changes, whether of the device or of the method of making the device as fall within the true spirit and scope of this invention.

What we claim as new and desire to secure by Letters Patent of the United States is:

1. An optical maser comprising a crystal having a pair of substantially parallel opposing surfaces, said surfaces being respectively reflective and partially transmissive to internal electromagnetic radiation, said crystal comprising calcium chlorophosphate doped with pentavalent manganese, and pumping means juxtaposed in close relationship with said crystal for supplying pumping radiation to said crystal to cause a population inversion therein.

2. An optical maser of the type set forth in claim 1 wherein said manganese is present in an amount ranging from a small but finite quantity up to a maximum of 10.0 percent by weight.

3. The maser as described in claim 1 wherein said calcium chlorophosphate is calcium chloroapatite.

4. The maser as described in claim 1 wherein said calcium chlorophosphate is spodiosite.

5. The maser as described in claim 2 wherein said calcium chlorophosphate is calcium chloroapatite.

6. The maser as described in claim 2 wherein said calcium chlorophosphate is spodiosite.

References Cited

UNITED STATES PATENTS

| | | |
|---|---|---|
| 2,664,401 | 12/1953 | McKeag et al. |
| 2,772,241 | 11/1956 | Ranby. |
| 3,124,539 | 3/1964 | Ishler et al. |
| 3,157,603 | 11/1964 | Mooney et al. |

JEWELL H. PEDERSON, *Primary Examiner.*

E. BAUER, *Assistant Examiner.*

U.S. Cl. X.R.

252—301.4